United States Patent
Perez

[11] Patent Number: 6,058,651
[45] Date of Patent: May 9, 2000

[54] HANGING PLANT APPARATUS

[76] Inventor: Jose L. Perez, 130 SW. 24th St., Fort Lauderdale, Fla. 33315

[21] Appl. No.: 08/458,689

[22] Filed: Jun. 2, 1995

[51] Int. Cl.⁷ ...................................................... A01G 9/02
[52] U.S. Cl. ..................................... 47/65.8; 47/67; 47/82
[58] Field of Search ................................ 47/66 B, 67 H, 47/82, 83, 65.5, 65.8

[56] References Cited

U.S. PATENT DOCUMENTS

| | | |
|---|---|---|
| 2,956,370 | 10/1960 | Weiboldt . |
| 3,930,334 | 1/1976 | Johnston . |
| 3,990,176 | 11/1976 | Johnson . |
| 4,109,442 | 8/1978 | Maasbach ............................... 47/66 B |
| 4,556,184 | 12/1985 | O'Sullivan ............................. 47/67 H |
| 4,750,292 | 6/1988 | Alstig ..................................... 47/66 B |
| 4,965,963 | 10/1990 | Lyon ...................................... 47/81 S |
| 5,193,306 | 3/1993 | Whisenant . |

FOREIGN PATENT DOCUMENTS

| | | | |
|---|---|---|---|
| 0009525 | 1/1981 | Japan ..................................... 47/66 B |
| 2147484 | 5/1985 | United Kingdom ....................... 47/82 |
| 2257885 | 1/1993 | United Kingdom .................. 47/67 H |
| 2259842 | 3/1993 | United Kingdom .................. 47/66 B |
| 94009614 | 5/1994 | WIPO .................................... 47/67 H |

*Primary Examiner*—Michael J. Carone
*Assistant Examiner*—Joanne C. Downs
*Attorney, Agent, or Firm*—Alvin S. Blum

[57] ABSTRACT

A hanging plant apparatus has a conical mesh sleeve with a rigid ring in the upper margin. Suspending elements are attached to the ring and extend upward for hanging the apparatus. The lower margin has a drawstring element in the hem. The lower margin of the sleeve is slipped over the upper rim of a conventional rigid plant pot and the drawstring element pulled tight to attach the pot to the bottom of the sleeve. The drawstring element is comprised of one or more plastic cable ties. When the sleeve and pot are filled with plant growth media, holes are cut into the mesh through which various plants can be inserted to-provide a unique hanging plant container with multiple plants growing out of the cone at various levels.

20 Claims, 1 Drawing Sheet

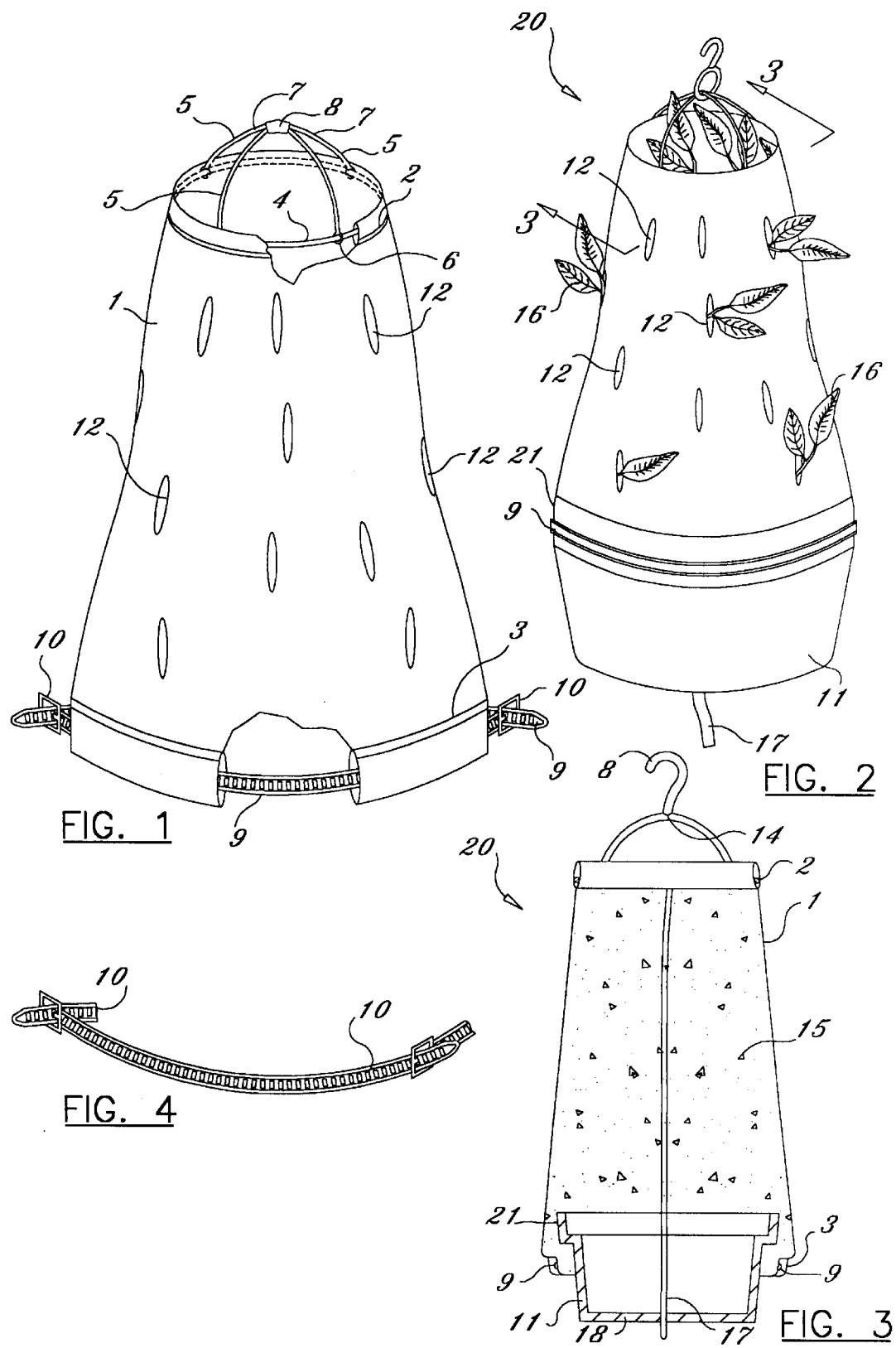

HANGING PLANT APPARATUS

BACKGROUND OF THE INVENTION

This invention relates to the cultivation of potted plants and more particularly to apparatus for enhancing the cultivation of hanging plants.

In U.S. Pat. No. 3,990,179, issued Nov. 9, 1976 to Johnson et al., the problems encountered in preparing a hanging plant with stems emerging from various openings in the container for enhanced appearance are discussed. A pot with two rigid interlocking sections is disclosed with slots between the sections providing openings into which plants may be inserted before locking the two sections together. This arrangement permits the placement of the plants only at predetermined positions at a single level, greatly limiting the artistic freedom of the user and the potential for enhanced appearance and utility of various arrangements of the plants in a hanging pot.

SUMMARY OF THE INVENTION

It is accordingly an object of the invention to provide a hanging plant apparatus useful in combination with a wide variety of plant containers in which the individual plant stems may be made to emerge at various locations as directed.

The apparatus of the invention comprises a conic section made of a mesh fabric with the smaller top edge incorporating a rigid ring with hanging elements attached thereto. The larger lower edge of the cone incorporates a drawstring-like cord which is slipped over the top edge of a plant receptacle and drawn tight so that the hanging elements support the cone and receptacle. The mesh material of the cone may be cut at any location to insert a plant. The cone and receptacle may be filled with appropriate plant growth material. The mesh allows aeration of the plant roots. The mesh is not wet by water so that the plant does not dry out rapidly. By greatly increasing the visible surface from which plants may be seen to be growing, a greatly enhanced hanging plant is easily prepared with minimal skills. It is possible to prepare a very tall plant assembly with multiple plants emerging at various levels that is quite stable when hanging, using this apparatus.

BRIEF DESCRIPTION OF THE DRAWINGS

FIG. 1 is a perspective drawing of the hanging plant apparatus of the invention.

FIG. 2 is a perspective view of the apparatus of claim 1 in use with plants and receptacle in place.

FIG. 3 is a sectional view taken through line 3—3 of FIG. 2.

FIG. 4 is a detail of the cable tie type of drawstring used in the apparatus.

DETAILED DESCRIPTION OF PREFERRED EMBODIMENTS

Referring now first to FIG. 1 a mesh sleeve 1 in the form of a frustum of a cone has a top marginal hem 2 and a bottom marginal hem 3, the bottom circumference being greater. A rigid circular member 4, a brass ring, is enclosed within top hem 2.

Elongate suspensory elements 5, which may be cords, wires or chains, are connected at their lower ends 6 to the ring 4. Their upper ends 7 are joined together in suspensory loop 8 which may hang from a hook, for example. Within the bottom hem 3 is contained a drawstring means in the form of two plastic cable ties 10 of the type well known in the electronics art, shown in detail in FIG. 4.

Referring now to FIGS. 2 and 3, the assembled hanging plant apparatus 20 of the invention is shown in use with plant growth media 15 and plants 16 in place. The growth media may be any of types well known in the art such as, for example, peat or sphagnum moss, potting soil, and the like. The sleeve 1 is made of a mesh or net fabric, preferably coated with a plastic that does not wet with water and that does not run or ravel when holes or slits 12 are cut in the sleeve at any selected locations for the entry of plants 16 therethrough. The bottom margin 3 of the sleeve 1 is slipped over the upper rim 21 of the rigid pot or plant receptacle 11, and the drawstring means 9 is pulled tight at a point below the rim 21 having a smaller circumference than the rim. The drawstring means, when pulled tight, cannot be released without cutting it. Thus, this assembly becomes relatively permanent. This assembly can be quite tall, and will support many plants at many levels for unusual and elegant arrangements. As best seen in FIG. 3, a wick 17 may be embedded in the core of the growth media 15 and extending through the bottom 18 of the receptacle 11. This may be checked for dryness to determine when the plant needs water.

A swivel 14 may be incorporated with suspensory element 5 so that the apparatus will freely rotate to expose all the plants to the light.

The rigid plant receptacle 11 may be selected as desired from any of those well known in the art, such as, for example, wire baskets, wooden rectangular baskets, plastic pots and ceramic pots. The apparatus of the invention may be used for bonsai and to prevent plants from becoming pot bound and oversize by simply cutting the drawstring 9, removing the bottom receptacle 11, trimming the excess roots, replacing the drawstring, and fastening the sleeve onto the receptacle again.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A hanging plant container apparatus for use with plants, growth media, and a rigid plant receptacle having an outer perimeter, the apparatus comprising:
   (A) a sleeve having a top margin and a bottom margin, said sleeve composed of a mesh material that will not run when cut for insertion of plants therethrough;
   (B) a rigid circular member attached to said top margin;
   (C) a plurality of upwardly extending, elongate suspensory elements, each said element having a lower first end attached to said circular member and an upper second end, all of said second ends being joined to a hanging means for suspending said apparatus; and
   (D) a drawstring means, connected to said bottom margin, for encircling and tightening down upon the outer perimeter of said rigid plant receptacle, thereby enabling said hanging means to support said sleeve and said plant receptacle and growth media and plants therein.

2. The apparatus according to claim 1, in which said top margin includes a hem and said circular member is within said hem in said top margin.

3. The apparatus according to claim 2, in which said bottom margin includes a hem and said drawstring means is within said hem in said bottom margin.

4. The apparatus according to claim 3, in which said drawstring means comprises at least one cable tie.

5. The apparatus according to claim 4, in which said top margin has a smaller perimeter than said bottom margin.

6. The apparatus according to claim 5, in which said sleeve has the shape of a frustum of a cone.

7. The apparatus according to claim 6, in which said receptacle is provided with a bottom portion having an aperture therethrough, and further comprising an elongate wick extending through said aperture for moisture testing.

8. The apparatus according to claim 1, in which said hanging means includes a swivel to enable said apparatus to rotate freely.

9. The apparatus according to claim 1, in which said receptacle is provided with a bottom portion having an aperture therethrough, and further comprising an elongate wick extending through said aperture for moisture testing.

10. A hanging plant container apparatus for use with plants, growth media, and a rigid plant receptacle having an outer perimeter, the apparatus comprising:

(A) a frustum of a cone composed of a mesh material that will not run or unravel when cut for insertion of plants therethrough, said frustum having a top margin and a bottom margin;

(B) a rigid circular member attached to said top margin;

(C) a plurality of upwardly extending elongate suspensory elements, each said element having a lower first end attached to said circular member and an upper second end, all of said second ends being joined to a hanging means for suspending said apparatus; and (D) a drawstring means,connected to said bottom margin, for tightening down upon said perimeter of said rigid plant receptacle, so as to enable said hanging means to support said frustum, said receptacle and growth media and plants therein.

11. The apparatus according to claim 10, in which said top and bottom margins are provided with hems and said circular member and said drawstring means are contained respectively therein.

12. The apparatus according to claim 11, in which said drawstring means comprises at least one cable tie.

13. The apparatus according to claim 12, in which said receptacle is provided with a bottom portion having an aperture therethrough, and further comprising an elongate wick extending through said aperture for moisture testing.

14. A hanging plant container apparatus for use with plants and growth media, the apparatus comprising:

(A) a sleeve having a top margin and a bottom margin, said sleeve composed of a mesh material that will not run when cut for insertion of plants therethrough;

(B) a rigid circular member attached to said top margin;

(C) a plurality of upwardly extending, elongate suspensory elements, each said element having a lower first and attached to said circular member and an upper second end, all of said second ends being joined to a hanging means for suspending said apparatus;

(D) a rigid plant receptacle having an outer perimeter; and (E) a drawstring means, connected to said bottom margin, for encircling and tightening down upon said outer perimeter of said rigid plant receptacle, thereby enabling said hanging means to support said sleeve and said plant receptacle and growth media and plants therein.

15. The apparatus according to claim 14, in which said top margin includes a hem and said circular member is within said hem in said top margin.

16. The apparatus according to claim 15, in which said bottom margin includes a hem and said drawstring means is within said hem in said bottom margin.

17. The apparatus according to claim 16, in which said drawstring means comprises at least one cable tie.

18. The apparatus according to claim 17, in which said top margin has a smaller perimeter than said bottom margin.

19. The apparatus according to claim 18, in which said sleeve has the shape of a frustum of a cone.

20. The apparatus according to claim 14, in which said hanging means includes a swivel to enable said apparatus to rotate freely.

\* \* \* \* \*